United States Patent Office.

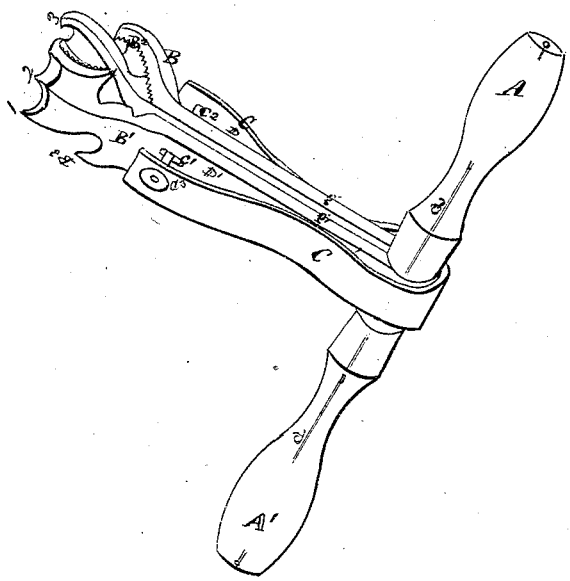

SAMUEL P. ROSS, OF PITTSBURG, AND NIKLAUS HALLER, OF ALLEGHENY CITY, PENNSYLVANIA.

Letters Patent No. 94,444, dated August 31, 1869.

IMPROVEMENT IN CORN-SHELLERS.

The Schedule referred to in these Letters Patent and making part of the same.

*To all whom it may concern:*

We, SAMUEL P. ROSS, of Pittsburg, and NIKLAUS HALLER, of Allegheny City, Allegheny county, Pennsylvania, having invented new and useful Improvements in "Corn-Shellers," do hereby declare that we believe that we are the originators or inventors of the same, and that the following is a full and accurate description thereof, reference being had to the accompanying drawings, and the letters of reference marked thereon, all of which is a part of this specification.

To enable others to make use of our invention, we will proceed to describe its construction, and operation of its parts and combination.

Figure 1 is a face view.
Figure 2 is a side view.

A A$^1$, of fig. 1, represent two wooden handles.

$a$ $a$, of fig. 1, represent an iron rod or pin, passing through the centre of the wooden handles A A$^1$ their entire length.

B B$^1$, of fig. 1, represent the two sheller-heads, or "cob-jaws," with the oblique flanges on inside, terminating in hooks.

$g$ $g'$, of fig. 2, represent the stems, which are a continuation of the casting from the "cob-jaws" B B$^1$ to the hinge A$^2$ of fig. 2.

1 2 3, of fig. 1, represent the oblique flanges of cob-jaws, terminating in hooks, and interlacing each other after the manner of the fingers of each hand, being partly crooked, and passing between each other alternately.

C C, of fig. 1, represent a curved spring, passing around the hinge A$^2$, of fig. 2, and down the sides of stems $g$ and $g'$ to near "cob-jaws" B and B$^1$.

C$^1$, of fig. 1, represents a slot in stems.

C$^2$ and C$^3$, of fig. 1, represent holes in each end of "curved spring."

B$^2$ and B$^3$, of figs. 1 and 2, represent obliquely-flanged and serrated shelling-hooks.

D and D$^1$, of fig. 1, represent the hollowed or recessed sides of "stems" $g$ and $g'$.

C$^4$, of fig. 2, represents the pin or rivet passing through the two ends of "curved spring."

A$^3$, of fig. 2, represents "hinge-flanges" joining the stems $g$ and $g'$.

A$^2$, of fig. 2, represents hole through "hinge-flange."

The nature of our improvements consist in making hand-sheller for corn more convenient and more effective.

The mode of constructing, and manner of operating it with our improvements, are as follows, to wit:

Two sheller-castings, with stems and cob-jaws B $g$ and B$^1$ $g'$, are taken and joined together at the hinge A$^2$, and the pin $a$ $a$, having been put through the hole A$^3$, the wooden handles A A$^1$ are driven on tightly over the pin, until they meet the hinge on each side. The two wooden handles and the two sheller-castings are now joined together.

The "curved spring" C C is then thrown around the hinge, and passed down the hollowed or recessed sides of the stems $g$ and $g'$, until the holes C$^2$ and C$^3$, in each end of spring, are brought opposite to the "slots," or elongated holes C$^1$, in stems. Then the pin, or rivet C$^4$, is passed both through the holes in spring and through "slots" in stems, and being riveted, or otherwise made fast on the outside of the "curved spring," thus holding them to their proper and relative places.

The sheller being thus completed, the size, form, and arrangement of the various improvements may be varied to suit the skill, taste, and judgment of the mechanic.

Therefore, we wish it clearly understood that we do not confine ourselves to a single form, size, or arrangement of the parts described as improvements.

Having thus described the various parts of the machine, and its construction, we proceed to set forth what we claim as our improvements.

We claim—

1. The "curved spring" C C.
2. Also, the slot C$^1$ in the stems $g$ and $g'$, through which the pin C$^4$ passes.
3. Also, the serrating of the oblique flanges in the "cob-jaws," that is, serrating one or more of the flanges with one or more teeth.
4. And further, we do not claim the interlocking of the shelling-fingers, but we do claim terminating them in a pointed hooked form.

SAMUEL P. ROSS.
NIKLAUS HALLER.

Witnesses:
O. C. WILSON,
H. N. MYGATT.